3,355,420
HALOGENATED RESINS STABILIZED WITH DIBASIC LEAD PHOSPHITE AND DIBASIC LEAD SULFITE
Hans Friedmann, Ernst Katscher, and Nikolaus Schredl, Vienna, Austria, assignors to Loba Chemie Dr. Paul Low-Beer & Co., Vienna, Austria
No Drawing. Filed June 2, 1965, Ser. No. 460,849
Claims priority, application Austria, June 22, 1964, 5,339/64
7 Claims. (Cl. 260—45.75)

ABSTRACT OF THE DISCLOSURE

Polymeric resins containing halogens, such as polyvinyl chloride and the like, and their compositions, can be stabilized to heat and light to an increased extent by incorporating therein a mixture of dibasic lead phosphite and dibasic lead sulfite, or mixed precipitates of these lead compounds in an amount of 1–5% by weight, based on the weight of the resin or composition. The ratio of these lead compounds relative to each other in the stabilizer may vary.

---

This invention relates to halogen-containing polymeric resins, such as halogenated vinyl resins, for example polyvinylchloride or vinylchloride copolymers, which are stabilized, by the incorporation of suitable additions, to undesired effects of heat and light on said resins. The invention also relates to stabilizers for preparing said stabilized resins.

It has been known that the incorporation of dibasic lead phosphite ($2PbO \cdot PbHPO_3 \cdot 0.5H_2O$) effects thermal stabilization and in a certain degree also stabilization to light, of the above mentioned polymeric and/or co-polymeric resins. It has now been discovered that the dibasic lead phosphite's stabilizing effect on halogen-containing polymeric resins can be increased by combining the dibasic lead phosphite with dibasic lead sulfite ($2PbO \cdot PbSO_3 \cdot 0.5H_2O$) by incorporating in the resins to be stabilized a mixture of dibasic lead phosphite with dibasic lead sulfite, said mixture consisting of 5–95% by weight of dibasic lead sulfite, preferably 5–70% by weight of dibasic lead sulfite, the balance being dibasic lead phosphite. Mixed crystals of dibasic lead sulfite and dibasic lead phosphite of this composition may also be used according to the invention. Such mixed stabilizers are incorporated in the halogen-containing polymeric resins in the range of 1–5% based on the weight of the halogenated polymers.

It has been found that such mixtures of dibasic lead phosphite with dibasic lead sulfite are considerably superior to stabilizers consisting substantially of dibasic lead phosphite only. It has been found that the stabilizing effect of each weight unit of the mixed stabilizer according to the invention is higher in comparison under equal conditions with the weight unit of a stabilizer consisting of dibasic lead phosphite only, so that according to the invention the same stabilizing effect can be attained with smaller amounts by weight of the stabilizer. By using the new stabilizer in the same proportions that were necessary prior to the invention for satisfactory stabilization with dibasic lead phosphite, a higher degree of stabilization is attained. This clearly shows that a synergistic activity of the two lead compounds manifests itself with regard to the thermal stabilization of halogenated polymeric and co-polymeric resins in carrying out the invention. With an increasing share of lead sulfite, in addition to the improvement in thermal stabilization, a higher light stabilization also occurs. The mixtures of dibasic lead phosphite and sulfite, containing 70% by weight and more of lead sulfite, especially 70–80%, are distinguished also by reduced costs of production.

Instead of a mixture produced from separately made dibasic lead phosphite and separately made dibasic lead sulfite, in carrying out the invention a product can be used, which is prepared by precipitating simultaneously suitable proportions of both lead salts as mixed crystals from an aqueous solution. It has ben found that mixed crystals thus obtained have even higher thermal and light stabilizing effects on halogenated polymeric and copolymeric resins than mixtures made of separately prepared lead sulfite and lead phosphite when applied under equal conditions.

It will be understood from the above that stabilizers embodying the present invention consist of a mixture, or mixed crystals, of 5–95% by weight, preferably 5–70% by weight, of dibasic lead sulfite, the balance to 100% being dibasic lead phosphite.

The stabilizer of this invention can be incorporated in the resin to be stabilized in any suitable manner and must be, of course, substantially uniformly distributed in said resin. In carrying out the invention and testing the resistance of the resulting product to heat, it is preferred to mix the resin, for example polyvinylchloride powder, with the desired amount of stabilizer (powder), pulverized lubricants and e.g. liquid dioctylphthalate as plasticizer to a uniform mixture which may be treated on a heated calender to form sheets.

*Examples*

To a uniform mixture of 100 parts by weight of polyvinylchloride and 43 parts of dioctylphthalate as plasticizer, various stabilizers consisting of dibasic lead phosphite and dibasic lead sulfite, as well as conventional amounts of lubricants were added, as listed in the following table.

For examination of the resins obtained from the listed ingredients, test samples were kept at 180° C. in an oven with air circulation in the oven during 60 minutes. After these 60 minutes, heating was continued at 190° C., in order to shorten the time of the tests.

TABLE

| Stabilizer | | Lubricant | | No Coloration up to Minutes | First Discoloration After Minutes | Dark Brown Coloration Throughout After Minutes |
|---|---|---|---|---|---|---|
| Proportion of mixture P:S | Parts | Kind | Parts | | | |
| 1:0 | 2 | B | 1 | 75 | 90 | 105 |
| / 1:1 | 2 | B | 1 | 105 | 135 | .......... |
| 1:0 | 2 | N | 0.7 | 45 | 60 | 75–90 |
| / 9:1 | 2 | N | 0.7 | 60 | 75 | 90 |
| + 9:1 | 2 | N | 0.7 | 45–60 | 60–75 | 75–90 |
| / 3:1 | 2 | N | 0.7 | 60–75 | 75–90 | 105 |
| / 2:1 | 2 | N | 0.7 | 60 | 75 | 105 |
| / 3:2 | 2 | N | 0.7 | 75 | 90 | 105–120 |
| + 3:2 | 2 | N | 0.7 | 75 | 90 | 105 |
| / 1:1 | 2 | N | 0.7 | 75–90 | 90–105 | 105 |
| / 2:3 | 2 | N | 0.7 | 75–90 | 90–105 | 105–120 |
| + 2:3 | 2 | N | 0.7 | 90 | 105 | 105–120 |
| / 1:2 | 2 | N | 0.7 | 75–90 | 90–105 | 120 |
| / 1:1 | 1.6 | N | 0.7 | 45 | 60 | 75–90 |

P=Dibasic lead phosphite.
S=Dibasic lead sulfite.
/=Salt from joint precipitation (mixed crystals).
+=Mechanical mixture of salts.
N=Neutral lead stearate.
B=Dibasic lead stearate.

It will be appreciated that the present invention is not limited to the treatment of the halogen-containing polymeric resins specifically described above and may be applied also to other resins in substantially analogous manner and under similar conditions. Further examples are polyvinylidene chloride, copolymers of vinyl chloride, for example copolymers of vinyl chloride and vinyl acetate; tripolymers of vinyl chloride, vinyl acetate and maleic anhydride; copolymers of vinyl chloride and methacrylate, copolymers of vinyl chloride and vinylidene chloride, polyvinylfluoride $(CH_2CHF)_x$; and copolyvinylchloride acetate. The plasticized polyvinylchloride used in the above described comparative tests was of the type "Solvic 229" having a K-value of 58–60 (in cyclo-hexanon). The compositions embodying the present invention may contain any suitable plasticizer in any suitable amount, e.g. 0 to 50% by weight.

What is claimed is:

1. A plastic polymeric composition of increased resistance to heat and light which contains a halogen-containing polymeric resin and a stabilizer to heat and light, said stabilizer consisting of a mixture of dibasic lead phosphite and dibasic lead sulfite, the percentage by weight of lead sulfite in said mixture being 5–95 and the percentage by weight of lead phosphite in said mixture being the balance to 100, said stabilizer mixture being present in the composition in an amount of 1–5% by weight, based on the weight of the composition, said halogen-containing polymeric resin being selected from the group consisting of polyvinylchloride, polyvinylidene chloride, a copolymer of vinylchloride and methylacrylate, a copolymer of vinyl chloride and vinyl acetate, a tripolymer of vinylchloride, vinyl acetate and maleic anhydride, a copolymer of vinyl chloride and vinylidene chloride, a polyvinylfluoride.

2. A plastic composition as claimed in claim 1, in which the percentage by weight of lead sulfite in the stabilizer mixture is 5–70%.

3. A plastic composition as claimed in claim 1, in which the stabilizer mixture consist of mixed precipitates of lead phosphite and lead sulfite obtained by simultaneous precipitation from the same solution.

4. A plastic composition as claimed in claim 1, in which the halogen-containing polymeric resin is polyvinylfluoride.

5. Stabilizer for increasing the resistance to heat and light of halogen-containing polymerized and copolymerized resins, said stabilizer consisting of a mixture of dibasic lead phosphite and dibasic lead sulfite which is 5–95% by weight of said mixture and the rest is dibasic lead phosphite.

6. Stabilizer as claimed in claim 5, in which the mixture consists of mixed crystals of dibasic lead phosphite and lead sulfite.

7. Stabilizer as claimed in claim 5, in which the mixture contains 5–70% by weight of dibasic lead sulfite.

References Cited

UNITED STATES PATENTS 2,141,126   12/1938   Doolittle _____ 91—70
2,912,397   11/1959   Houska et al. _____ 260—23

DONALD E. CZAJA, *Primary Examiner.*

V. P. HOKE, *Assistant Examiner.*